June 1, 1926.
A. B. HASLACHER
1,586,898
METHOD OF FREEZING AND TRANSPORTING PERISHABLE FOOD PRODUCTS
Filed March 30, 1925
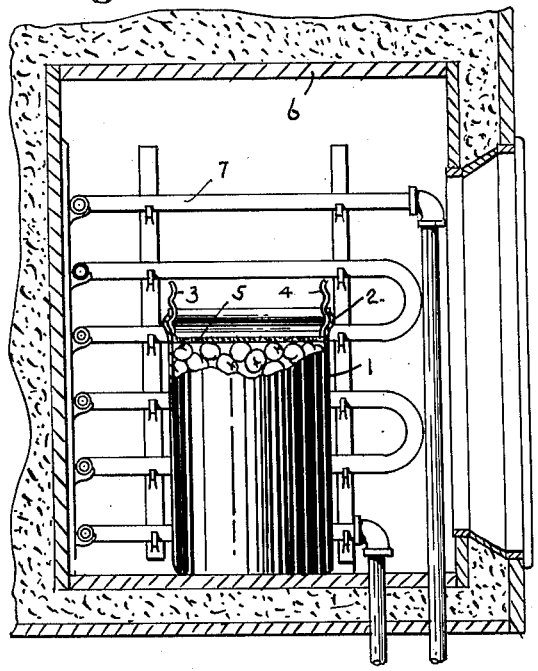
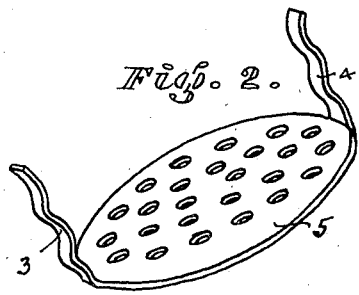
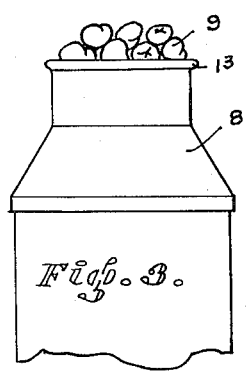
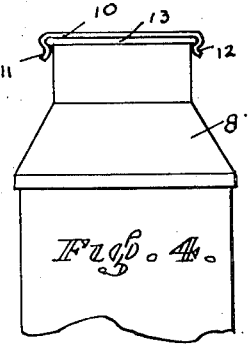
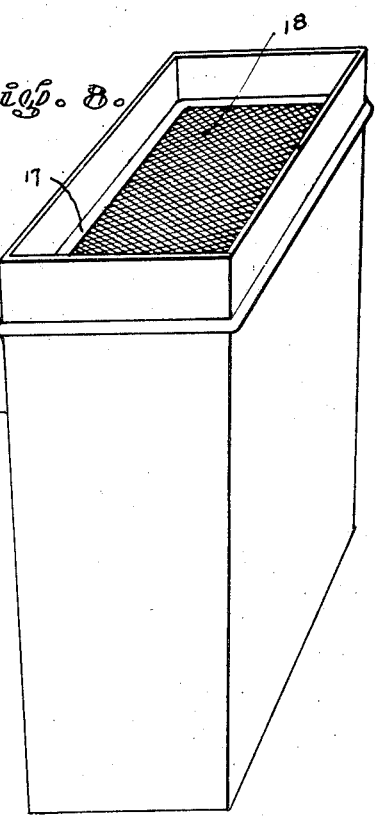
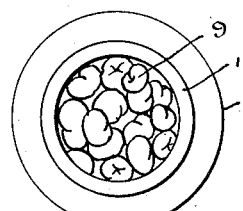
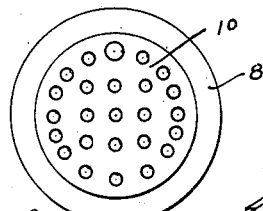
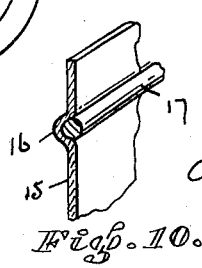
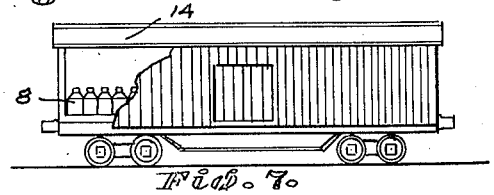

Patented June 1, 1926.

1,586,898

UNITED STATES PATENT OFFICE.

ALFRED B. HASLACHER, OF FARMINGTON, CALIFORNIA.

METHOD OF FREEZING AND TRANSPORTING PERISHABLE FOOD PRODUCTS.

Application filed March 30, 1925. Serial No. 19,297.

My invention has for its object the means and the method for preparing food products whereby they are most advantageously and efficiently preserved, handled and transported, and distributed and involves retaining them in a frozen condition.

Another object is freezing, handling and transporting of perishable food products while in what is conventionally known as solid pack condition, that is where the voids between the units of product are reduced to a minimum; and thus attaining the greatest quantity of produce packed in a minimum space and at a minimum expense.

By referring to the accompanying drawing my invention will be made clear.

In the drawing:—

Fig. 1 illustrates partly in section and partly in full view a container in which food products are being frozen within the container by conventional refrigerating means.

Fig. 2 is a detail of the screen or depressing member employed in combination with the container of Fig. 1.

Fig. 3 is an alternate form of container prior to employing my depressor and the freezing of the contents in solid packed condition.

Fig. 4 is similar to Fig. 3 except in this case the produce units have been depressed in a solid packed condition and the top applied, ready for freezing and also illustrates the same after freezing.

Figs. 5 and 6 are plan views of Figs. 3 and 4 respectively.

Fig. 7 is a freight car in which the containers carrying the solid packed frozen produce are being transported.

Fig. 8 is a different form of container with its depressor in place adapted to freeze the produce in solid pack condition in a cake of ice, and thereafter by inverting the container the cake of ice is removed for further handling and transportation.

Fig. 9 illustrates in a reduced plan view the locking member for the depressor of Fig. 8.

Fig. 10 is a prospective part sectional view of a portion of the container of Fig. 8 showing the engagement of the locking means therewith.

Throughout the figures similar numerals refer to identical parts.

One form of the container in which produce is to be packed and frozen and transported is shown by the numeral 1, having a beaded upper edge 2 within which is adapted to be locked by any conventional means as the fluted arms 3 and 4, adapted to engage with the bead 2 and thus hold depressed, a depressing member 5. The depressor is preferably perforated or of screen material.

The container is filled with water and produce to be frozen therein and the produce is then depressed by the member 5 which is held in its depressed position by the engaging means 3 and 4 in cooperation with the bead 5 of the container 1, thus securing the full immersion of all of the produce units.

The container so prepared is now placed within a conventional refrigerating chamber 6 and the temperature reduced below freezing through the refrigerating pipes 7, until the entire mass within the container is frozen solid.

A different form of container is shown at 8 wherein the units of produce 9 before freezing project above the top of the container and are depressed into a solid packed condition by the depressor 10, having snaps 11 and 12 which engage over the bead 13 and hold the produce in solid packed condition within the water until frozen. During the freezing operation the expanding water is forced through the openings of the depressor 10.

This form of container as shown in Figs. 3 to 6 is when frozen, entirely filled to the top with the solid packed produce.

The containers with the frozen produce are now introduced into the refrigerator car 14 and transported to distant markets as required.

At 15 is shown a container having tapering sides so as to easily discharge when inverted, a cake of ice, carrying produce frozen in the well known manner of producing artificial ice.

At 16 is a bead or suitable engaging means adapted to receive therein the spring member 17 which latter holds the depressing screen 18 in place, when food produce has been depressed to solid packed condition in the said container 15 by the depressor 18.

The container so prepared with the food produce in water is now frozen in the upright position shown and after freezing the engaging means 17 is removed and the cake of ice containing the solid packed produce therein is now removed by inverting the container and may be thus handled or shipped as required.

It will be noted that in employing my depressing means in the several forms here shown that as the fruit is depressed the superfluous water may emerge freely up through the screen or perforations either before or during the freezing period and that the depressor may advantageously be frozen in the ice as a part of the unit structure to be transported in the car 14.

When the produce arrives in the distant markets it is melted from or broken from the ice cake and is then ready for use.

I claim:—

1. The method of keeping, handling and preserving food products which consists of depressing said product within a body of water and while held so depressed freezing the mixture.

2. The method of keeping, handling and preserving food products which consists of depressing said product within a body of water in a container and while held so depressed freezing the mixture.

3. The method of preparing solid packed food units which consists in depressing said units into physical contact within a body of water and while held so depressed freezing the mass.

ALFRED B. HASLACHER.